Figure 1:
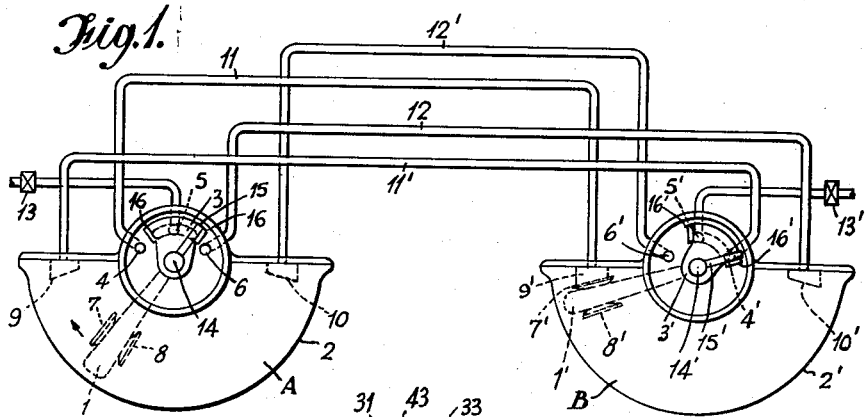

July 13, 1954  W. E. O'SHEI  2,683,353
DIFFERENTIAL FLUID PRESSURE MOTOR
Filed April 13, 1953

Inventor
William E. O'Shei
By
Holcombe, Wetherill & Brisbois
Attorney

Patented July 13, 1954

2,683,353

UNITED STATES PATENT OFFICE 2,683,353

DIFFERENTIAL FLUID PRESSURE MOTOR

William Edward O'Shei, London, England

Application April 13, 1953, Serial No. 348,483

Claims priority, application Great Britain April 18, 1952

3 Claims. (Cl. 60—97)

The present invention relates to differential fluid pressure motors, and more particularly to such motors which are intended for driving windscreen wiper systems. With differential fluid pressure motors, such as suction motors, for operating windscreen wiper systems, there is a sudden reversal of the motor piston, paddle or the like (herein generally referred to as a piston) at the end of each operating stroke. This imposes considerable strain on the mechanism coupling the motor to the wiper arm spindles, giving rise to wear and slap and the production of noise.

The present invention has for its object to provide a differential fluid pressure motor in which the speed of reversal may be controlled to effect the reversal more smoothly.

To this end, according to the invention, the motor piston or the like actuates a first change-over valve associated with ports for supplying differential fluid pressure to opposite sides of the piston or the like of a second motor, the actuation of the first change-over valve as the piston of the first motor approaches the end of its stroke reversing the supply of differential fluid pressure to the second motor to cause the piston or the like thereof to move in the direction opposite to its last preceding direction of movement, the movement of the piston or the like of the second motor actuating a second change-over valve associated with ports for supplying differential fluid pressure to opposite sides of the piston or the like of the first motor, the actuation of said second change-over valve by the reverse movement of the second piston or the like reversing the supply of differential fluid pressure to the first motor to cause the piston thereof to move in the direction opposite to its last preceding direction of movement. This second motor may comprise a double-acting piston or paddle movable in a cylinder, or chamber, a double-acting diaphragm movable in a chamber, or an equivalent device, the piston, diaphragm or the like (herein generally referred to as a piston) being moved back and forth in accordance with the operation of the valve actuated by the piston of the first motor.

The change-over valve actuated by the first piston need not be provided with snap-over mechanism as hitherto but can be a valve which is positively moved into either one or other of its positions by the movement of the first paddle. The valve actuated by the second motor also need not be provided with snap-over mechanism but can be a valve which is positively moved by the action of the second piston.

With the arrangement according to the invention, the second motor may be controlled to effect the reversal of the first motor in any desired manner. Thus, for example, the valve actuated by the second motor may not change over before the first piston has completed its stroke or it may move through a position in which it closes off both sides of the first motor from the source of fluid pressure or suction before reversing the connections, whereby the movement of the piston of the first motor will be stopped before reversal takes place. The speed of operation of the second motor, and thus the delay or dwell at reversal of the first motor, may be controlled by restricting its inlet or exhaust passages or by providing an adjustable control valve in the differential fluid pressure supply line to the second motor.

By means of the present invention, the delay or dwell at reversal of the wiper blade may be changed without affecting the speed of the wiper blade during normal movement. The dwell time may be continuously adjustable or may be adjustable to two or more predetermined values. If desired, means may be provided for adjusting the speed of movement of the wiper blade, which can be independent of the means for changing the dwell during reversal.

The second motor may be constructed as a unit with the first motor. The second motor may be smaller and less powerful than the first motor, since it does not have to drive the wiper blade, and may constitute an auxiliary motor.

According to a feature of the invention, the piston of the first motor is arranged to bear against a stop before reversal takes place. These stops may be constituted, in the case of a motor of the oscillating paddle type, by cup-shaped valve seatings carried from the cover plate at opposite ends of the motor and adapted to be sealed off by sealing-off members carried at opposite sides of the paddle when the paddle is in one or other of its limiting positions.

With this construction a maximum arc of wipe is obtained, which is greater than that obtainable with motors as hitherto constructed with a snap-over valve in which a certain amount of overtravel is necessary at each end of the paddle stroke to allow for reversal. This construction avoids the necessity of the gearing arrangements which have hitherto often been employed in order to obtain an increased arc of wipe.

By the paddle abutting against a stop at the end of each stroke, reversal is effected in a smooth manner with consequent reduction of noise and wear on the operating parts.

Furthermore, with the construction described, the first motor may be parked in either one or other of its limiting positions, with the paddle sealed off from the source of suction, by simply cutting off the supply of suction to the second motor. This facilitates installation in a vehicle since the stopping and starting of the first motor and the location of its piston in a parking position can be controlled by a simple shut-off valve connected by two conduits to the motor, thus avoiding the necessity of special valves with three conduits as have hitherto been proposed for remote control or the provision of Bowden or other cables for actuating the valve on the motor from a remote point. Also, by providing a valve of which the degree of opening may be adjusted, the speed of operation of the second motor can be changed to change the dwell during the reversal at the end of each stroke of the first motor. The valve may be continuously adjustable or may be constructed with predetermined locations so that the dwell may be adjusted either continuously or to any of two or more predetermined values.

According to a further feature of the invention, the second motor is constituted by a separate motor arranged for driving a second wiper blade. Thus, for example, for cleaning a windscreen by means of two wiper blades, each blade is actuated by a separate motor, the valve actuated by the piston of one motor controlling the reversal of the supply of differential fluid pressure to the other motor and vice versa. Each valve is preferably a simple slide or rotary valve which is positively moved, if necessary through a lost motion connection, by the movement of the associated piston or paddle and without an over-centre snap action. Each motor is preferably provided with valve seatings at each end of the motor with co-operating sealing-off members on opposite sides of the paddle as above described.

With this arrangement one wiper blade executes a wiping action which shifts its associated valve to start the second motor to move its associated wiper blade. The first motor remains stationary until the second motor moves its associated valve to reverse the supply of differential fluid pressure to the first motor, whereby the first motor executes a reverse movement. The two motors continue to operate in this way, each controlling the starting and stopping of the other.

The motors may be so interconnected that the second motor moves in the same or the opposite direction to that in which the first motor has moved in its immediately preceding stroke.

The arrangement provides a flexible system which facilitates installation in a motor vehicle and is particularly suitable for systems adapted for wiping curved windscreens or so-called V windscreens having two sections arranged at an angle to one another.

By simply closing off one of the conduits leading from one of the automatic valves to the other motor, both motors will be stopped in an end parking position. By closing off the other conduit, the motors will be parked at their opposite ends. Selective means may be provided for selecting the ends at which the motors are parked.

According to a further feature of the invention, the movement of the first motor piston actuates two valves, the first of which serves for controlling the supply of differential fluid pressure to opposite sides of the first motor piston and the second of which controls the supply of differential fluid pressure to an auxiliary motor, the arrangement being such that when the first motor piston reaches the desired limit of its travel it moves the first valve into a neutral position in which the supply of differential fluid pressure is cut off from the main motor, or in which the pressure on opposite sides of the motor piston is equalized, in which position the main motor piston has moved the second valve to a position in which the supply of differential fluid pressure to the auxiliary motor is reversed, the consequent movement of the auxiliary motor acting to move the first valve from the neutral position to reverse the supply of differential fluid to the main motor whereby the motor piston will move in the opposite direction until it reaches its other limiting position when the first valve is again moved to the neutral position and the second valve is moved to a position which again reverses the auxiliary motor which latter actuates the first valve to reverse the supply of differential fluid pressure to the main motor, and so on. The auxiliary motor may comprise a double-acting piston movable in a cylinder, a double-acting diaphragm movable in a chamber or pairs of interconnected pistons or diaphragms movable in separate cylinders or chambers, or some other equivalent arrangement whereby the first valve may be moved in one direction or the other from the neutral position to which it is moved by the motor piston or the like, depending upon the position of the second valve.

By means of this arrangement the motor piston will stop moving when the first valve has been moved thereby into its neutral position, and the instant at which the motor piston commences to move in the reverse direction will be dependent upon the time taken by the auxiliary motor to move the first valve beyond the neutral position and into the position in which the supply of differential fluid pressure to the main motor is reversed. Thus by controlling the speed of operation of the auxiliary motor, the delay or dwell at the end of each stroke of the main motor may be adjusted.

Figure 2:
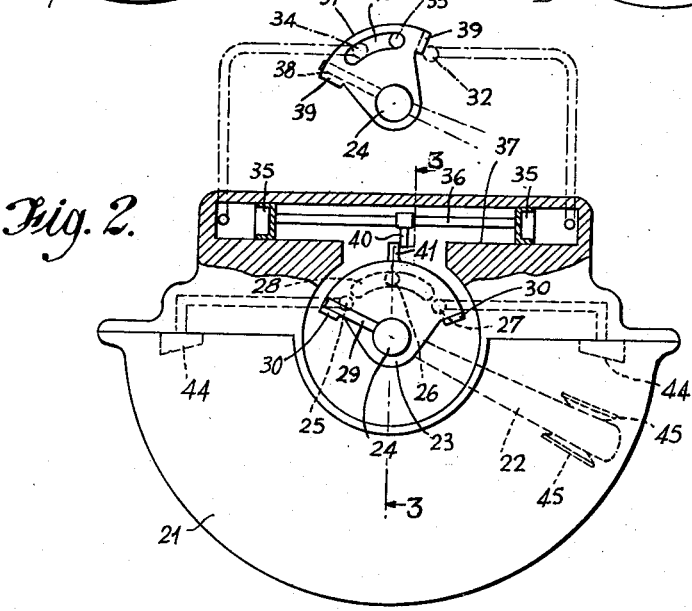
Figure 3:
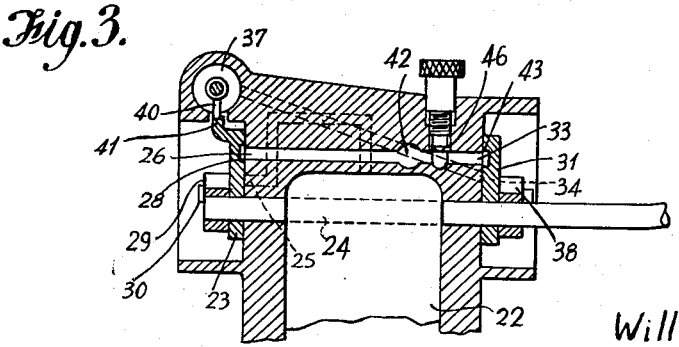

In order that the invention may be more clearly understood, reference will now be made to the accompanying drawing in which Figure 1 shows diagrammatically a motor arrangement according to this invention, Figure 2 shows a side view partly in section of a modified motor construction, Figure 3 shows a section on the line 3—3 of Figure 2.

Referring to Figure 1 the motor A is generally similar to a suction-operated windscreen wiper motor of the paddle type in which the paddle 1 moves in an arcuate chamber 2, the movement of the paddle actuating a semi-rotary valve 3 associated with ports 4, 5, 6. Opposite sides of the paddel 1 carry sealing-off members 7, 8 adapted to cooperate with valve seating cups, 9, 10 respectively carried from the underside of the motor cover and through which suction or atmospheric air are applied to the opposite sides of the paddle 1. The second motor B is similar to motor A, corresponding parts being marked with corresponding reference numerals with a prime.

The two motors A and B are of similar construction to conventional paddle type suction motors except that the outer ports 4, 6 are not connected to opposite ends of the paddle chamber of the same motor but are connected through pipes 11, 12 respectively to opposite sides of the other motor, that is ports 4 and 6 of motor A are connected respectively to the valve seating cups 9', 10' of motor B and ports 4', 6' of motor B are connected respectively to valve seating cups 9 and 10 of motor A. The central ports 5, 5' of the two motors are each connected to a source of suction through control valves 13, 13' respectively.

The other constructional difference from conventional paddle type suction motors is that the snap-over mechanisms normally provided for snapping over the valves 3, 3' as soon as they move past their dead centre positions are not necessary, the valves 3, 3' being positively pushed to their limiting positions by the movements of the associate paddle. The rocker shaft 14 of each motor may be provided with a conventional kicker 15 cooperating with ears 16 on the valve although by appropriate spacing of the ears 16, the kicker 15 may instead be constituted by an arm rigid with the rocker shaft 14.

The mode of operation of the arrangement is as follows:

When both valves 13 and 13' are open and the paddles 1, 1' and valves 3, 3' are in the positions shown, it will be noted that the suction fed to the port 5' is connected through the port 4' and the pipe 11' to the cup 9 of the motor A whereby paddle 1 moves towards the left as shown by the arrow. In this movement it pushes the valve 3 in a clockwise direction and when the sealing member 7 engages with the cup 9 the valve 3 will have moved to its right-hand position connecting the ports 5 and 6 and opening the port 4 to atmosphere. Consequently suction is applied through the pipe 12 to the cup 10' and causes the paddle 1' to swing towards the right. During this time paddle 1 remains in its extreme left-hand position. When paddle 1' reaches its right-hand position, it reverses its valve 3' to apply suction to the right-hand end of motor A to cause its paddle 1 to swing towards the right. The cycle of operation is repeated. The valve ports 4, 6, 4', 6' are open to atmosphere when the valves 3 and 3' respectively pass through their neutral positions.

The motor B may be of smaller size than motor A and serve as an auxiliary motor for controlling the motor A, the rocker shaft of which is connected to drive a windscreen wiper blade. Alternatively both motors A and B may be of the same size and the rocker shafts 14, 14' of these two motors may each be connected to drive a wiper blade.

By adjusting the valve 13 the speed of movement of the paddle 1' and thus the delay or dwell before reversal of the motor A may be adjusted. Similarly the adjustment of the valve 13' will control the speed of the paddle 1 and the delay or dwell of reversal of motor B. By closing valve 13 and leaving valve 13' open, motor A would always be parked at one or other of its extreme limiting positions. Single-stroke wiping under push-button control can be achieved by providing a push-button controlled bye-pass for the valve 13. Parking can also be achieved by closing off one or other of the pipes 11 or 12 with an appropriate valve or by associating a pair of pipes 11 and 12 with a changeover valve such that the connections between the ports 4 and 6 and the cups 9' and 10' will be interchanged.

With the arrangement described, the motor A, and in the case of a dual wiper system both motors A and B, swing through the maximum possible arc, the arrangement enabling arcs of wipe to be obtained which previously have only been achieved by the provision of gearing between the rocker shaft and the wiper blade.

Instead of employing two separate motors A and B it will be understood that motor B may be embodied as a unit in the motor A in which case the motor B may be constituted by pistons, plungers or diaphragms accommodated in appropriate bores or chambers in the body of motor A. Further, the valve actuated by the main motor may be located remote from the main motor; for example it may be located for direct actuation by a remote wiper arm spindle as described in British specification No. 679,469. A single valve actuated by the main motor or wiper system may actuate an auxiliary motor controlling two or more main motors.

Figures 2 and 3 show an alternative embodiment according to the invention in which the movement of the main motor piston actuates two valves, the first of which serves for controlling the supply of differential fluid pressure to opposite sides of the main motor piston and the second of which controls the supply of differential fluid pressure to an auxiliary motor, the arrangement being such that when the motor piston reaches the desired limit of its travel it moves the first valve into a neutral position in which the piston stops, and in which position the second valve has been moved to reverse the auxiliary motor, the consequent movement of the auxiliary motor acting to move the first valve beyond the neutral position to reverse the supply of differential fluid pressure to the main motor.

In this embodiment, the motor is generally of the conventional suction-operated paddle type comprising an arcuate chamber 21 within which the paddle 22 moves, the semi-rotary valve 23, actuated by the movement of the rocker shaft 24, and the ports 25, 26, 27 associated therewith being so arranged that when the paddle reaches the desired limit of its stroke, the valve 23 will have moved into a neutral position (shown in Fig. 2) with the cavity 28 therein disconnected from both the ports 25 and 27 so that the vacuum is cut off from both sides of the paddle. The valve is also so shaped that in this neutral position both the ports 25 and 27 are covered and not open to the atmosphere. The normal over-centre snap-action mechanism associated with the semi-rotary valve in conventional suction motors of this type is dispensed with so that the valve will remain in this position until moved therebeyond by the auxiliary motor as hereinafter described. The semi-rotary valve 23 is actuated from the rocker shaft 24 by the arm 29 fixed thereto and which engages with the ears 30 at opposite ends of the valve with a lost-motion connection so that the valve will only be moved to the neutral position when the paddle reaches the limit of its stroke in either direction, the valve being free to be moved beyond its neutral position by the auxiliary motor so as to reverse the connections of the source of suction and the atmosphere to the motor chamber to reverse the movement of the paddle.

At the opposite side of the motor a second semi-rotary valve 31 is mounted on the rocker shaft and is associated with ports 32, 33, 34 for controlling the reversal of the auxiliary motor constituted by the pair of pistons 35 interconnected by the rod 36 and movable in a bore 37 in the motor housing. The second valve 31 is driven from the rocker shaft 24 by the arm 38 which engages with ears 39 at opposite ends of the valve with a lost-motion connection such that when the first valve 23 is moved into its neutral position the second valve 31 will be in either one or other of two positions, depending upon the direction of movement of the paddle, in which alternative positions the supply of suction to the auxiliary motor will be reversed. The second valve is so arranged that when it is moved into one or other of said two alternative positions the pistons 35 will operate to move a finger 40 depending from the rod 36 which is adapted to engage with a further ear 41 projecting from the centre of the first valve 23 and thereby to move the first valve 23 beyond the neutral position and reverse the suction and atmosphere connections to the main motor, whereby the paddle 22 will be moved in the reverse direction to its other limiting position.

In Figure 2 the valve 31 and its associated ports, although not actually visible in the side view shown, are diagrammatically indicated above the motor for the purpose of explaining the operation of the motor. Ports 32 and 34 are connected respectively to the right-hand and left-hand ends of the auxiliary motor 35. Ports 26 and 33 are connected to a passage 42 leading to a source of suction. When the paddle 22 moves to its right-hand limit position, as shown in Figure 2, the cavity 43 in valve 31 will connect ports 33 and 34 to apply suction to the left-hand side of the auxiliary motor thereby causing the pistons 35 and the finger 40 to move towards the left, the finger 40 engaging, in this movement, with the ear 41 to move the valve 23 in an anti-clockwise direction to cause the cavity 28 to connect ports 25 and 26 and apply suction to the left-hand side of the paddle 22. The finger 40 disengages itself and moves beyond the ear 41 in completing this left-hand movement, so that during the clockwise movement of the paddle 22 the valve 23 is free to move back to its neutral position without restriction by the finger 40. When it reaches this neutral position, the valve 31 will have changed its position so that the cavity 43 will connect ports 33 and 32 and the auxiliary motor will move towards the right, the finger 40 engaging with the ear 41 to turn the valve 23 further in the clockwise direction and apply suction to the right-hand side of the paddle 23. The cycle of operation repeats.

The delay or dwell before reversal of the paddle will depend upon the time delay before the valve actuating finger actuates the first valve, and this can be adjusted by changing the differential pressure applied to the auxiliary motor, for example by a manually adjustable valve 46.

With the motor shown in Figures 2 and 3 the stroke of the paddle may be terminated at positions bearing against or spaced away from the cup-shaped valve seatings 44 against which the sealing-off members 45 carried by the paddle engage when the motor is in the parked position. When the piston stroke terminates away from these cups, the paddle can be parked in a position beyond its normal arc of movement. This may be effected by the provision of a manual parking control valve as known in the art. The motor may be constructed for parking at only one end of its stroke, or, if desired, for being optionally parked at either end of its stroke.

Various modifications may be made in the construction of the motor described with reference to Figures 2 and 3 without departing from the scope of the invention. Thus instead of simply cutting off the suction from both sides of the paddle when the first valve is moved to its neutral position, the first valve may be arranged to vent both sides of the paddle to atmosphere when in its neutral position.

If the valve actuating finger or member driven by the auxiliary motor does not automatically disengage from the first valve after it has moved the latter through the required distance beyond the neutral position (for example if the ear 41 is pushed back and forth by two spaced fingers which cannot override the ear 41), the timing of the valves is preferably such that the auxiliary motor will commence to move just before the first valve is moved by the paddle. Thus the paddle can move the first valve without having to overcome the resistance of the auxiliary motor (which of course it could do by reason of the main motor being more powerful than the auxiliary motor), the alternative valve actuating finger moved by the auxiliary motor engaging with the first valve after the latter has been moved to its neutral position by the paddle.

In a further modification, both valves may be incorporated in a single valve structure, the ports and passages being so arranged, for example being elongated, so that the further movement imparted to the valve structure by the auxiliary motor will not shift the second valve portion to prevent the auxiliary motor from operating in the desired direction, at any rate until the valve structure has been moved through the requisite distance to reverse the main motor.

The valve mechanism and auxiliary motor need not be assembled with the main motor but can be located remote therefrom. For example the valve mechanism may be arranged for direct actuation by a wiper arm spindle as described in British specification No. 679,469.

The invention can also be applied to motors operated by compressed air or other fluid.

I claim:

1. A differential fluid pressure motor arrangement wherein the motor piston actuates a first change-over valve associated with ports for supplying differential fluid pressure to opposite sides of the piston of a second motor, the actuation of the first change-over valve as the piston of the first motor approaches the end of its stroke reversing the supply of differential fluid pressure to the second motor to cause the piston thereof to move in the direction opposite to its last preceding direction of movement, the movement of the piston of the second motor actuating a second change-over valve associated with ports for supplying differential fluid pressure to opposite sides of the piston of the first motor, the actuation of said second change-over valve by the reverse movement of the second piston reversing the supply of differential fluid pressure to the first motor to cause the piston thereof to move in the direction opposite to its last preceding direction of movement.

2. Arrangement as claimed in claim 1, wherein means are provided for controlling the speed of operation of the second motor and thus the dwell at reversal of the first motor.

3. Differential fluid pressure motor arrangement as claimed in claim 1, wherein the movement of the first motor piston actuates two valves, the first of which serves for controlling the supply of differential fluid pressure to opposite sides of the first motor piston and the second of which controls the supply of differential fluid pressure to an auxiliary motor, the arrangement being such that when the first motor piston reaches the desired limit of its travel it moves the first valve into a neutral position in which the pressure on opposite sides of the motor piston is equalised, in which position the main motor piston has moved the second valve to a position in which the supply of differential fluid pressure to the auxiliary motor is reversed, the consequent movement of the auxiliary motor acting to move the first valve from the neutral position to reverse the supply of differential fluid to the main motor whereby the motor piston will move in the opposite direction until it reaches its other limiting position when the first valve is again moved to the neutral position and the second valve is moved to a position which again reverses the auxiliary motor which latter actuates the first valve to reverse the supply of differential fluid pressure to the main motor, and so on.

References Cited in the file of this patent

UNITED STATES PATENTS

| Number | Name | Date |
|---|---|---|
| 2,042,898 | Horton | June 2, 1936 |